(12) United States Patent
Nozawa et al.

(10) Patent No.: US 10,199,945 B2
(45) Date of Patent: Feb. 5, 2019

(54) BATTERY UNIT

(71) Applicant: TOYOTA JIDOSHA KABUSHIKI KAISHA, Toyota-shi, Aichi-ken (JP)

(72) Inventors: Takashi Nozawa, Toyota (JP); Kenjiro Shiba, Takahama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 18 days.

(21) Appl. No.: 15/645,291

(22) Filed: Jul. 10, 2017

(65) Prior Publication Data

US 2018/0019680 A1   Jan. 18, 2018

(30) Foreign Application Priority Data

Jul. 15, 2016 (JP) .................. 2016-140455

(51) Int. Cl.
```
H02J 7/00       (2006.01)
H02M 3/335      (2006.01)
B60L 11/18      (2006.01)
H02J 7/14       (2006.01)
```

(52) U.S. Cl.
CPC ..... H02M 3/33523 (2013.01); B60L 11/1803 (2013.01); H02J 7/0063 (2013.01); H02M 3/33561 (2013.01); H02M 3/33584 (2013.01); *B60L 2210/10* (2013.01); *B60Y 2200/92* (2013.01); *H02J 7/0065* (2013.01); *H02J 7/14* (2013.01); *Y10S 903/904* (2013.01)

(58) Field of Classification Search
CPC ............ B60L 11/1803; B60L 2210/10; B60Y 2200/92; H02J 7/0063; H02J 7/0065; H02J 7/14; H02M 3/33523; H02M 3/33561; H02M 3/33584; Y10S 903/904
See application file for complete search history.

(56) References Cited

U.S. PATENT DOCUMENTS

| | | | |
|---|---|---|---|
| 2010/0127565 | A1 | 5/2010 | Fukazu et al. |
| 2013/0148251 | A1 | 6/2013 | Iwashita et al. |
| 2013/0164580 | A1 | 6/2013 | Au |
| 2014/0327391 | A1* | 11/2014 | Niederhauser ........ B60L 11/182 320/108 |
| 2015/0021985 | A1 | 1/2015 | Matsuda |
| 2016/0144725 | A1 | 5/2016 | Nozawa |
| 2017/0104382 | A1 | 4/2017 | Kaji et al. |

FOREIGN PATENT DOCUMENTS

| | | |
|---|---|---|
| JP | 9-233830 A | 9/1997 |
| JP | 2006-345606 A | 12/2006 |
| JP | 2008-030722 A | 2/2008 |
| JP | 2010-130713 A | 6/2010 |

(Continued)

*Primary Examiner* — Vuthe Siek
(74) *Attorney, Agent, or Firm* — Sughrue Mion, PLLC

(57) ABSTRACT

A unit is equipped with a main battery, a pair of third wires that are connected to the main battery, a system main relay that is arranged on the third wires, a pair of fourth wires that is connected to the third wires between the system main relays and the main battery to the converter, a converter that is connected to the fourth wires, a case for accommodation, a main connector that connects the wire to a pair of first wires outside the case, and a sub-connector that connects the converter to a pair of second wires outside the case.

4 Claims, 8 Drawing Sheets

(56) References Cited

FOREIGN PATENT DOCUMENTS

| | | |
|---|---|---|
| JP | 2011-31815 A | 2/2011 |
| JP | 2011-244580 A | 12/2011 |
| JP | 2013-123285 A | 6/2013 |
| JP | 2015-227078 A | 12/2015 |
| JP | 2016-101057 A | 5/2016 |
| JP | 2016-123149 A | 7/2016 |
| JP | 2017-030408 A | 2/2017 |
| WO | 2006/132052 A2 | 12/2006 |

* cited by examiner

BATTERY UNIT

INCORPORATION BY REFERENCE

The disclosure of Japanese Patent Application No. 2016-140455 filed on Jul. 15, 2016 including the specification, drawings and abstract is incorporated herein by reference in its entirety.

BACKGROUND

1. Technical Field

The present specification relates to a battery unit including a battery that supplies electric power to a motor for running of an electric vehicle.

2. Description of Related Art

In some electric vehicles, a converter is arranged between a pair of main wires that connect a battery and a motor for running to each other, and a pair of sub-wires that connect a sub-battery to auxiliaries (a power steering, an air-conditioner and the like). This converter performs at least either steps up or steps down a voltage to exchange electric power between the main wires and the sub-wires. In the present specification, this converter is referred to as a main-sub (which is abbreviated as MS because the converter is arranged between the main wires and the sub-wires) converter. Switches are inserted in the pair of the main wires respectively, and can make a changeover between a state where the main battery and the motor for running are connected to each other, and a state where the main battery and the motor for running are disconnected from each other.

In Japanese Patent Application Publication No. 2008-30722 (JP 2008-30722 A), there is described an art of arranging both a main battery and an MS converter in a luggage room that is located in a vehicle rear region. In this art, a case that accommodates the MS converter is arranged on a case that accommodates the main battery. In this configuration, a main-side converter wire that connects the MS converter to a main wire is routed in such a manner as to be exposed to the outside of the case that accommodates the MS converter, and to the outside of the case that accommodates the main battery.

SUMMARY

A high voltage of the main battery is applied to the main-side converter wire. In the case where the wire is exposed to the outsides of the cases, it is necessary to insert a switch into the wire and make a changeover between conduction of the wire and non-conduction of the wire.

The present specification discloses an art of inserting a switch into a main-side converter wire that connects a converter and a main wire to each other.

A battery unit disclosed in the present specification is used by being connected to a pair of first wires extending toward an electric power control unit (which is synonymous with "extending from the electric power control unit") that supplies electric power to a motor for running, and a pair of second wires extending toward a sub-battery (which is synonymous with "extending from the sub-battery") that supplies electric power to an auxiliary machine. The battery unit is equipped with a case, a pair of main connectors that are exposed from the case and that connect the first wires, and a sub-connector that is exposed from the case and that connects the second wires. A main battery, a pair of third wires, system main relays, a converter, a pair of fourth wires and a pair of fifth wires are accommodated in the case. The third wires are connected to a pair of electrodes of the main battery and the main connectors. System main relays respectively are arranged in the third wires, the system main relays respectively include switches configured to switch between conduction and non-conduction of the third wires. The fourth wires are connected to the third wires between the system main relays and the main battery to the converter. Besides, the fifth wires are connected to the sub-connector and the converter.

According to the aforementioned battery unit, the main battery and the converter are accommodated in the same case. Therefore, the fourth wires that connect the main battery and the converter to each other can be routed in such a manner as not to be exposed to the outside of the case. As a result, conventionally required switches for the fourth wires can be dispensed with.

The battery unit may be further equipped with a pair of sixth wires. The sixth wires may connect the third wires between the system main relays and the main connector to the converter, in the case.

The converter of the battery unit may include a first converter and a second converter. The fourth wires may be connected to the first converter, and the sixth wires may be connected to the second converter.

The converter may include a first circuit connected to the forth wires, a second circuit connected to the sixth wires, a third circuit connected to the sub-connector, a first transformer provided in the first circuit, a second transformer provided in the second circuit, a third transformer provided in the third circuit, the first circuit may be configured to convert a direct current electric power of the forth wires into an alternating current electric power, the first circuit may be configured to convert the alternating current electric power supplied via the first transformer into a direct current electric power, the second circuit may be configured to convert a direct current electric power of the sixth wires into an alternating current electric power, the second circuit may be configured to convert the alternating current electric power supplied via the second transformer into a direct current electric power, the third circuit may be configured to convert a direct current electric power of the second wires into an alternating current electric power, the third circuit may be configured to convert the alternating current electric power supplied via the third transformer into a direct current electric power.

According to aforementioned configuration, electric power can be exchanged between the first wires and the six wires. Besides, the wires can be routed in the case.

The present specification relates to a main battery unit for an electric vehicle. A main battery, system main relays and a converter are accommodated in a single case. According to this art, fourth wires which connect the main battery and the converter to each other and to which a high voltage of the main battery is applied are not exposed to the outside of the case. Therefore, safety can be ensured even when no switch is arranged in each of the fourth wires.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
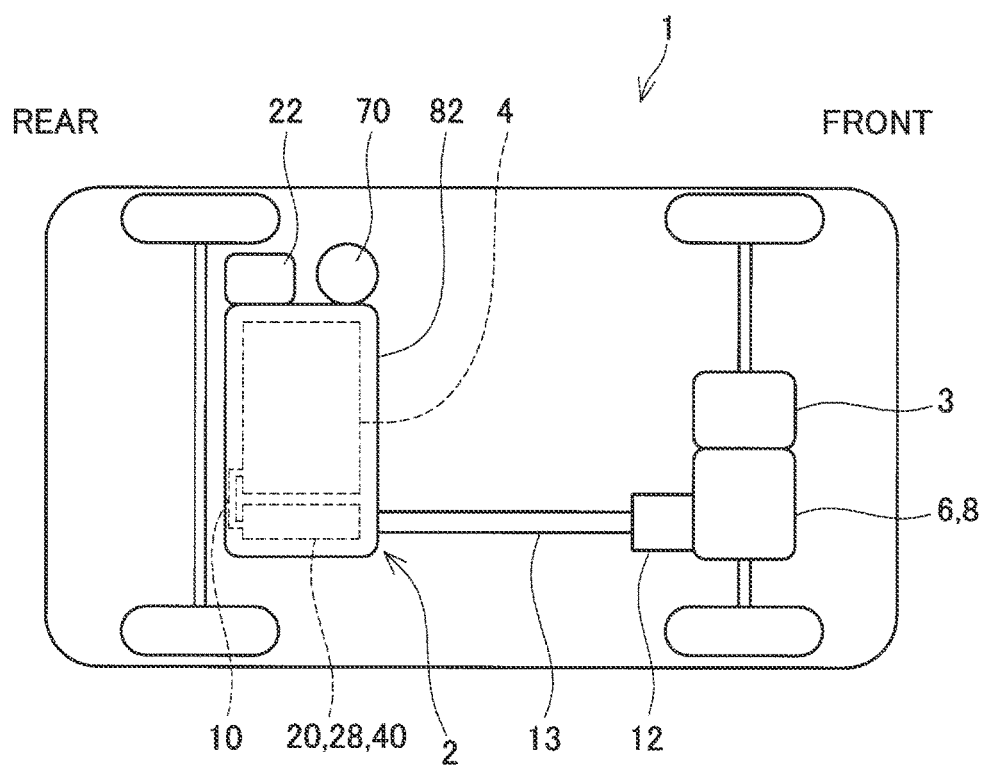
FIG. 1 is a schematic block diagram of a hybrid vehicle according to each of the embodiments of the disclosure.

FIG. 1 partially shows a drive system and an electric system of a hybrid vehicle 1. The hybrid vehicle 1 is equipped with an engine 3 and motors 6 and 8. An output torque of the engine 3 and an output torque of the motor 8 are appropriately distributed/synthesized by a motive power distribution mechanism, and are transmitted to wheels via an axle. The motor 6 generates electric power through the use of the rest of the motive power of the engine, and drives the motor 8. Besides, in the case where the hybrid vehicle 1 runs with the aid of the electric power of the main battery 4, the motor 8 is driven by the electric power from the main battery 4. The main battery 4 is accommodated in a main battery unit (which will be abbreviated hereinafter as a unit) 2. Incidentally, FIGS. 1 and 2 represent only components that are needed to explain the art disclosed in the present specification, and do not show components irrelevant to the explanation.

Figure 2:
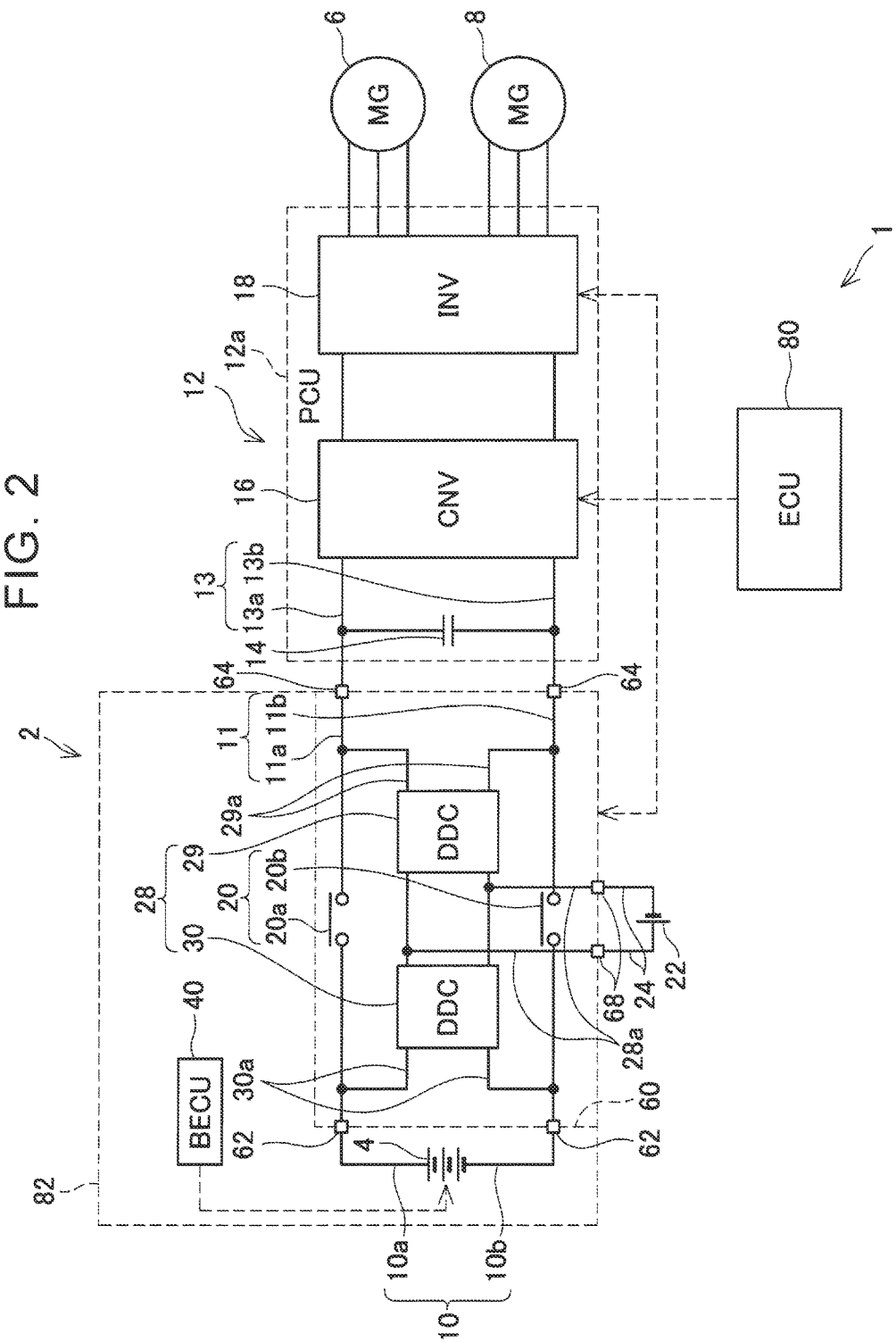
FIG. 2 is a block diagram of an electric system and a drive system of the hybrid vehicle according to the first embodiment of the disclosure.

As shown in FIG. 2, the unit 2 according to the first embodiment of the disclosure is equipped with the main battery 4, a pair of wires 10 (third wires), wires 11, a system main relay 20 (which will be referred to hereinafter as "an SMR 20"), an MS converter 28, a battery electronic control unit 40 (which will be referred to hereinafter as "a battery ECU 40"), a case 82, an inner case 60, battery connectors 62, sub-connectors 68 and main connectors 64. The unit 2 is arranged in a vehicle rear region of the hybrid vehicle 1.

The main battery 4 is a secondary battery such as a nickel hydride battery, a lithium-ion battery or the like. In the present embodiment of the disclosure, the voltage of the main battery 4 is about 300 V. The main battery 4 has a plurality of battery modules connected in series to one another. Each of the plurality of the battery modules has a plurality of battery cells.

The main battery 4 is connected to the pair of the wires 10. The pair of the wires 10 are equipped with a positive electrode line 10a that is connected to a positive electrode terminal of the main battery 4, and a negative electrode line 10b that is connected to a negative electrode terminal of the main battery 4. The pair of the wires 10 are connected to the pair of the wires 11 respectively via a battery connector 62. The pair of the wires 11 are equipped with a positive electrode line 11a that is connected to the positive electrode line 10a, and a negative electrode line 11b that is connected to the negative electrode line 10b.

The wires 11 are provided with the SMR 20. The SMR 20 is equipped with a switch 20a that makes a changeover between conduction and non-conduction of the positive electrode line 11a, and a switch 20b that makes a changeover between conduction and non-conduction of the negative electrode line 11b. Thus, the SMR 20 makes a changeover between conduction and non-conduction of the wires 11.

The pair of the wires 11 are connected to a pair of wires 13 (first wires) via a pair of main connectors 64 respectively. The pair of the wires 13 are equipped with a positive electrode line 13a that is connected to the positive electrode line 11a, and a negative electrode line 13b that is connected to the negative electrode line 11b.

As shown in FIG. 1, the pair of the wires 13 are routed from the vehicle rear region to a front side portion of the vehicle. In the front side portion of the vehicle, the wires 13 are connected to an electric power control unit (which will be referred to hereinafter as "a PCU") 12. As shown in FIG. 2, the PCU 12 is provided between the main battery 4 and the motors 6 and 8. The PCU 12 is equipped with a smoothing capacitor 14, a main converter 16 and an inverter 18. The smoothing capacitor 14 smoothens the voltages of the wires 13. The main converter 16 steps up a voltage supplied from the main battery 4 to a voltage suited to drive the motors 6 and 8, as necessary. Besides, the main converter 16 can also step down the voltage generated by the motor 6 or 8 to a voltage suited to charge the main battery 4. In the present embodiment of the disclosure, the voltage used to drive the motors 6 and 8 is about 600 V. The inverter 18 converts a DC electric power supplied from the main battery 4 into a three-phase AC electric power for driving the motors 6 and 8. Besides, the inverter 18 can also convert a three-phase AC electric power generated by each of the motors 6 and 8 into a DC electric power for charging the main battery 4. The smoothing capacitor 14, the main converter 16 and the inverter 18 are all accommodated in a common PCU case 12a.

The hybrid vehicle 1 is equipped with a sub-battery 22 that is lower in voltage than the main battery 4. The sub-battery 22 is a secondary battery such as a lead battery or the like. In the present embodiment of the disclosure, the voltage of the sub-battery 22 is about 13 to 14.5 V. The sub-battery 22 is connected to auxiliaries such as a power steering, an air-conditioner and the like via wires 24 (second wires).

The pair of the wires 24 are connected to a pair of sub-connectors 68 respectively. The MS converter 28 is arranged between the pair of the sub-connectors 68 and the pair of the wires 11. The MS converter 28 is equipped with a first converter 30 and a second converter 29. The pair of the sub-connectors 68 are connected to the first converter 30 and the second converter 29 via a pair of wires 28a (fifth wires).

The first converter 30 is connected to the pair of the wires 11, at positions between the main battery 4 and the SMR 20, via a wire 30a (a fourth wire). The first converter 30 can perform a step-down operation for supplying electric power from the wires 11 to the wires 24 in a stepped-down manner. The first converter 30 is a so-called unidirectional DCDC converter, and is a step-down DCDC converter. When the SMR 20 is conductive, both the first converter 30 and the second converter 29 perform the step-down operation, so the sub-battery 22 can be charged with the electric power from the main battery 4, the electric power generated by the motor 6, and the electric power generated by the motor 8 via both the converters 29 and 30. In this case, the current supplied to the sub-battery 22 can be made larger, and the time needed to charge the sub-battery 22 can be made shorter than in the case where the sub-battery 22 is charged via only one of the converters 29 and 30.

The second converter 29 is connected to the pair of the wires 11, at positions between the PCU 12 and the SMR 20, via a pair of wires 29a (sixth wires). The second converter 29 can perform both a step-down operation for supplying electric power from the wires 11 to the wires 24 in a stepped-down manner, and a step-up operation for supplying electric power from the wires 24 to the wires 11 in a stepped-up manner. The second converter 29 is a so-called bidirectional DCDC converter, and a step-up/step-down DCDC converter. Through the performance of the step-down operation by the second converter 29, the sub-battery 22 can be charged with the electric power generated by each of the motors 6 and 8, regardless of whether the SMR 20 is conductive or non-conductive. Besides, through the performance of the step-up operation by the second converter 29, the motors 6 and 8 can be driven with the aid of the electric power of the sub-battery 22, regardless of whether the SMR 20 is conductive or non-conductive.

The battery ECU 40 is connected to the main battery 4. The battery ECU 40 measures a voltage, a current, a temperature and the like of the main battery 4, and provides an electronic control unit 80 (which will be referred to hereinafter as "an ECU 80") with information on the input/output to/from the main battery 4.

The ECU 80 controls the PCU 12, the SMR 20, the MS converter 28 and the battery ECU 40. In addition to the aforementioned components, the ECU 80 controls the operation of various components constituting the electric system of the hybrid vehicle 1.

Figure 3:
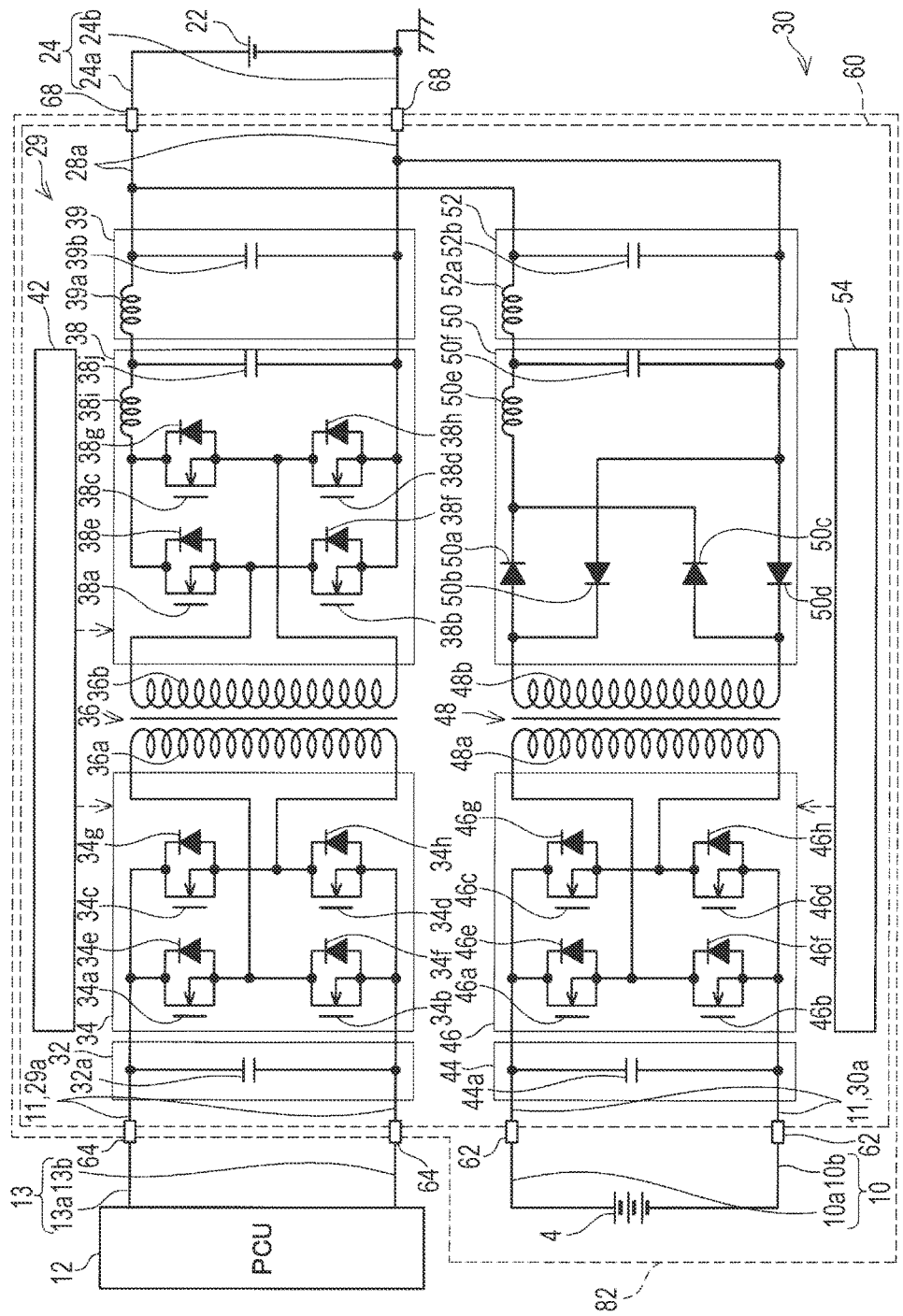
FIG. 3 is a circuit diagram of an MS converter according to the first embodiment of the disclosure.

FIG. 3 shows the general configuration of the MS converter 28. Incidentally, the SMR 20 and the battery ECU 40 are omitted in FIG. 3. In fact, in the case 82, the positive electrode line 11a of the wires 11 connected to the main connectors 64 and the positive electrode line 11a of the wires 11 connected to the battery connectors 62 are connected to each other via a switch, and the negative electrode lines 11b and 11b are also connected to each other via a switch. Both the switches constitute the SMR 20.

The second converter 29 is equipped with a main-side filter 32, a main-side circuit 34, a transformer 36, a sub-side circuit 38, a sub-side filter 39 and a control circuit 42. The second converter 29 is an insulation-type DCDC converter.

The main-side filter 32 is equipped with a capacitor 32a that restrains noise from being generated on the PCU 12 side with respect to the second converter 29. The main-side circuit 34 is equipped with switching elements 34a, 34b, 34c and 34d, and recirculation diodes 34e, 34f, 34g and 34h that are connected in parallel to the switching elements 34a, 34b, 34c and 34d respectively. The switching element 34a and the switching element 34b are connected in series to each other. The switching element 34c and the switching element 34d are connected in series to each other. The main-side circuit 34 can also be regarded as a switching circuit.

The transformer 36 is equipped with a main-side coil 36a and a sub-side coil 36b. In the transformer 36, electric power can be supplied from the main-side coil 36a to the sub-side coil 36b in a stepped-down manner, and electric power can be supplied from the sub-side coil 36b to the main-side coil 36a in a stepped-up manner. The main-side coil 36a is connected at one end thereof between the switching element 34a and the switching element 34b, and the main-side coil 36a is connected at the other end thereof between the switching element 34c and the switching element 34d.

The sub-side circuit 38 is equipped with switching elements 38a, 38b, 38c and 38d, recirculation diodes 38e, 38f, 38g, 38h that are connected in parallel to the switching elements 38a, 38b, 38c and 38d respectively, an inductor 38i and a capacitor 38j. The switching element 38a and the switching element 38b are connected in series to each other. The switching element 38c and the switching element 38d are connected in series to each other. The sub-side coil 36b is connected at one end thereof between the switching element 38a and the switching element 38b. The sub-side coil 36b is connected at the other end thereof between the switching element 38c and the switching element 38d. The sub-side circuit 38 can also be regarded as a switching circuit.

The sub-side filter 39 restrains noise from being generated on the wires 24 sides with respect to the second converter 29. In the present embodiment of the disclosure, the sub-side filter 39 is equipped with an inductor 39a and a capacitor 39b.

The control circuit 42 can communicate with the ECU 80 (see FIG. 2). The control circuit 42 controls the operation of the switching elements 34a, 34b, 34c and 34d of the main-side circuit 34 and the switching elements 38a, 38b, 38c and 38d of the sub-side circuit 38, in accordance with a command from the ECU 80.

The operation of the second converter 29 will be described. In performing the step-down operation, the second converter 29 converts a DC electric power into an AC electric power in the main-side circuit 34, steps down the voltage of the AC electric power in the transformer 36, and converts the AC electric power into a DC electric power in the sub-side circuit 38. Incidentally, in this case, the switching elements 38a, 38b, 38c and 38d do not operate, and rectification by the recirculation diodes 38e, 38f, 38g and 38h and smoothing by the inductor 38i and the capacitor 38j are carried out in the sub-side circuit 38. Thus, electric power can be supplied from the wires 11 to the wires 24 in a stepped-down manner.

In performing the step-up operation, the second converter 29 converts a DC electric power into an AC electric power in the sub-side circuit 38, steps up the voltage of the AC electric power in the transformer 36, and converts the AC electric power into a DC electric power in the main-side circuit 34. Incidentally, in this case, the switching elements 34a, 34b, 34c and 34d do not operate, and rectification by the recirculation diodes 34e, 34f, 34g and 34h is carried out in the main-side circuit 34, and smoothing is carried out in the main-side filter 32. Thus, electric power can be supplied from the wires 24 to the wires 11 in a stepped-up manner.

The first converter 30 is equipped with a main-side filter 44, a main-side circuit 46, a transformer 48, a sub-side circuit 50, a sub-side filter 52 and a control circuit 54. The first converter 30 is an insulation-type DCDC converter.

The main-side filter 44 is equipped with a capacitor 44a that restrains noise from being generated on the main battery 4 side with respect to the first converter 30. The main-side circuit 46 is equipped with switching elements 46a, 46b, 46c and 46d, and recirculation diodes 46e, 46f, 46g and 46h that are connected in parallel to the switching elements 46a, 46b, 46c and 46d respectively. The switching element 46a and the switching element 46b are connected in series to each other. The switching element 46c and the switching element 46d are connected in series to each other. The main-side circuit 46 can also be regarded as a switching circuit.

The transformer 48 is equipped with a main-side coil 48a and a sub-side coil 48b. The transformer 48 can supply electric power from the main-side coil 48a to the sub-side coil 48b in a stepped-down manner. The main-side coil 48a is connected at one end thereof between the switching element 46a and the switching element 46b. The main-side coil 48a is connected at the other end thereof between the switching element 46c and the switching element 46d.

The sub-side circuit 50 is equipped with diodes 50a, 50b, 50c and 50d, an inductor 50e and a capacitor 50f. The diodes 50a, 50b, 50c and 50d constitute a bridge circuit. The sub-side coil 48b is connected at one end thereof between the diode 50a and the diode 50b. The sub-side coil 48b is connected at the other end thereof between the diode 50c and the diode 50d.

The sub-side filter 52 restrains noise from being generated on the wires 24 sides with respect to the first converter 30. In the present embodiment of the disclosure, the sub-side filter 52 is equipped with an inductor 52a and a capacitor 52b.

The control circuit 54 can communicate with the ECU 80 (see FIG. 2). The control circuit 54 controls the operation of the switching elements 46a, 46b, 46c and 46d of the main-side circuit 46 in accordance with a command from the ECU 80.

The operation of the first converter 30 will be described. In performing the step-down operation, the first converter 30 converts a DC electric power into an AC electric power in the main-side circuit 46, steps down the voltage of the AC electric power in the transformer 48, and converts the AC electric power into a DC electric power in the sub-side circuit 50. In this case, rectification by the diodes 50a, 50b, 50c and 50d and smoothing by the inductor 50e and the capacitor 50f are carried out in the sub-side circuit 50. Thus, electric power can be supplied from the wires 11 to the wires 24 in a stepped-down manner.

Incidentally, the first converter 30 is not absolutely required to be configured such that the main-side circuit 46 is equipped with the switching elements 46a, 46b, 46c and 46d and that the control circuit 54 controls the operation of the main-side circuit 46, as shown in FIG. 3. The first converter 30 may be configured such that the sub-side circuit 50 is equipped with a switching element and that the control circuit 54 controls the operation of the sub-side circuit 50, or may be configured such that each of the main-side circuit 46 and the sub-side circuit 50 is equipped with a switching element and that the control circuit 54 controls the operation of each of the main-side circuit 46 and the sub-side circuit 50.

Figure 5:
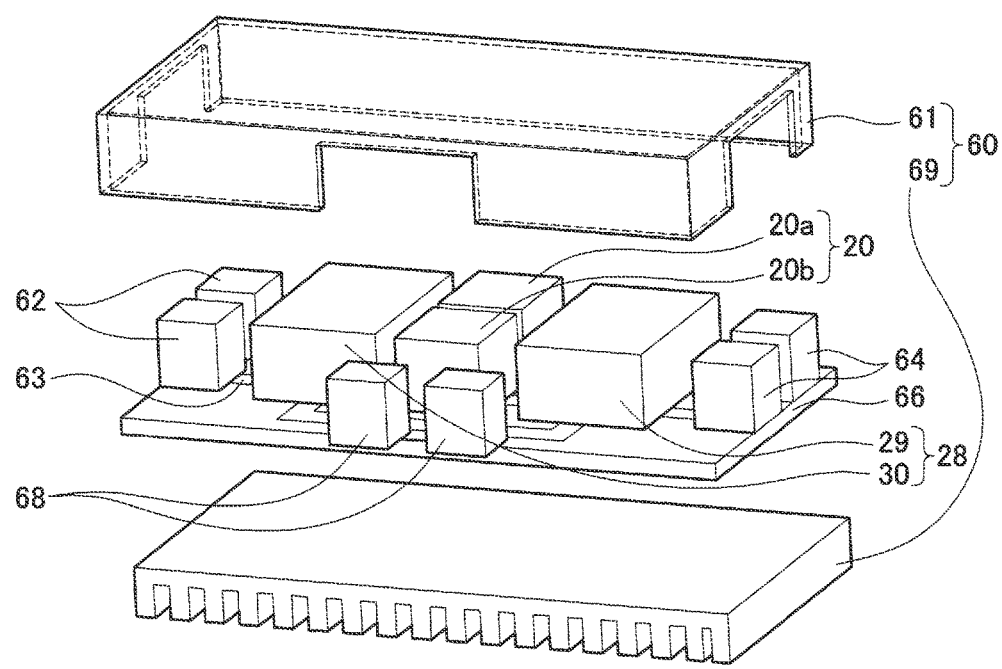
FIG. 5 is a perspective view of a state where an inner case according to the first embodiment of the disclosure is open.

As shown in FIG. 5, the SMR 20 and the MS converter 28 are accommodated in the inner case 60. The inner case 60 is equipped with a bottom plate 69 and a cover 61. A substrate 66 is placed on the bottom plate 69. The first converter 30 and the second converter 29 for the SMR 20 and the MS converter 28 are mounted on the substrate 66. The SMR 20, the first converter 30 and the second converter 29 are connected to one another by a pattern wire 63 that is routed on the substrate 66. The pattern wire 63 constitutes the wires 11, the wires 29a and 30a and the wires 28a shown in FIG. 2.

Furthermore, a pair of battery connectors 62, a pair of main connectors 64 and a pair of sub-connectors 68 are mounted on the substrate 66. The connectors 62, 64 and 68 are exposed from the inner case 60. The pair of the battery connectors 62 are connectors for connecting the pair of the wires 11 and the pair of the wires 10 to each other respectively. The SMR 20 and the MS converter 28 are connected to the main battery 4 via the wires 11 and the wires 10, by the pair of the battery connectors 62.

The pair of the main connectors 64 are connectors for connecting the pair of the wires 11 and the pair of the wires 13 (see FIG. 2) to each other respectively. The SMR 20 and the MS converter 28 are connected to the PCU 12 via the pair of the wires 11 and the pair of the wires 13, by the pair of the main connectors 64. The pair of the sub-connectors 68 are connectors for connecting the pair of the wires 28a and the pair of the wires 24 to each other respectively. The MS converter 28 and the sub-battery 22 are connected to each other via the pair of the wires 28a and the pair of the wires 24, by the pair of the sub-connectors 68.

Figure 4:
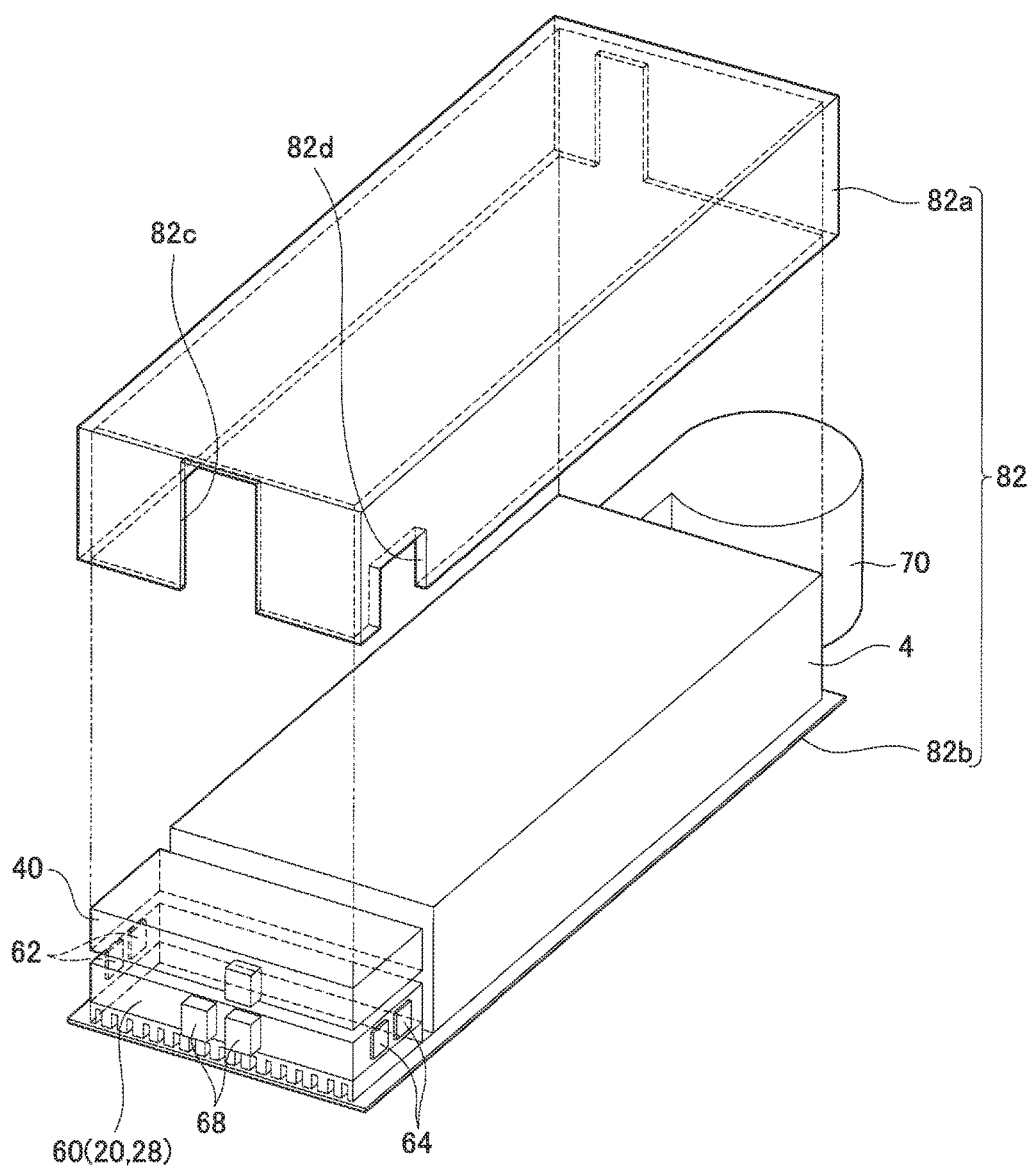
FIG. 4 is a perspective view of a state where a cover of a case according to the first embodiment of the disclosure is open.

As shown in FIG. 4, the main battery 4, the inner case 60 and the battery ECU 40 are accommodated in the common case 82. The case 82 is equipped with a bottom plate 82b and a cover 82a. The main battery 4, the inner case 60 and the battery ECU 40 are placed on the bottom plate 82b, and is covered with the cover 82a. The cover 82a is provided with notches 82c and 82d at positions corresponding to the main connectors 64 and the sub-connectors 68 respectively. The sub-connectors 68 are exposed from the case 82, by the notch 82c. By the same token, the main connectors 64 are exposed from the case 82, by the notch 82d.

On the other hand, the cover 82a is not provided with a notch corresponding to the battery connectors 62. Therefore, the battery connectors 62 are not exposed from the case 82. The battery connectors 62 are connected to the main battery 4 via the wires 10 (see FIG. 1). The wires 10 are also accommodated in the case 82.

A blower 70 is arranged outside the case 82. The blower 70 blows air into the case 82 to cool the interior of the case 82.

According to this configuration, the main battery 4, the MS converter 28 and the SMR 20 are all arranged in the common case 82. Thus, the wires 10, 11 and 30a between the main battery 4 and the MS converter 28 can be routed without being exposed from the case 82. As a result, there is no need to provide a switch in wires 30a.

Besides, in comparison with the configuration in which the MS converter 28 is arranged outside the case 82, there is no need to arrange a connector for connecting the MS converter 28 to the wires 11, so the number of connectors can be made smaller. Furthermore, the number of wire harnesses for connecting the SMR 20, the first converter 30 and the second converter 29 to one another can be reduced by arranging the SMR 20 and the MS converter 28 in the inner case 60, and connecting the SMR 20, the first converter 30 and the second converter 29 to one another by the pattern wire 63 routed on the substrate 66.

Figure 6:
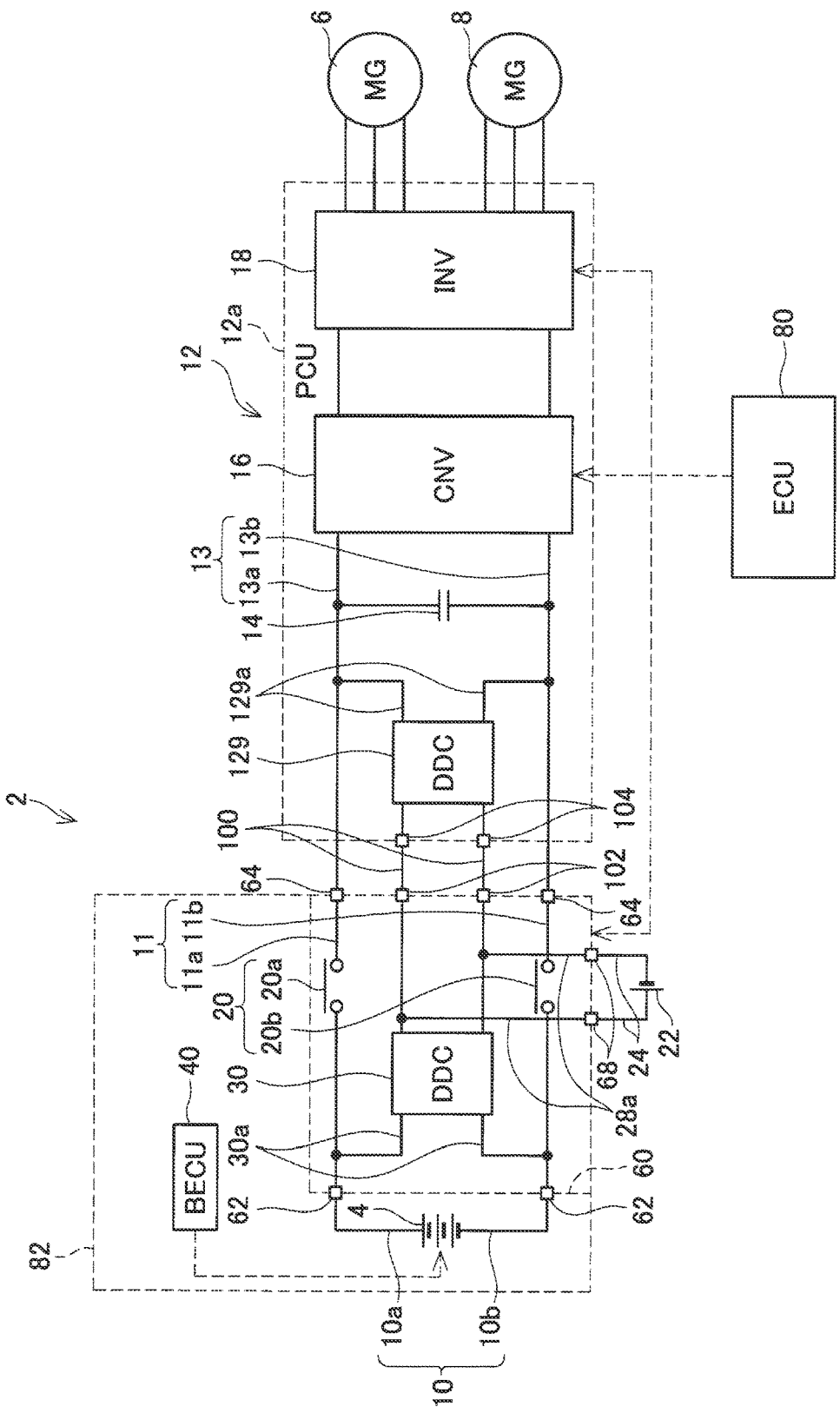
FIG. 6 is a block diagram of an electric system and a drive system of the hybrid vehicle according to the second embodiment of the disclosure.

As shown in FIG. 6, in the unit 2 according to the second embodiment of the disclosure, the MS converter 28 is equipped with the first converter 30, but on the other hand, is not equipped with the second converter 29. In this configuration, the main battery 4, the third wires 10, the wires 11, the wires 30a, the MS converter 28 and the battery ECU 40 are accommodated in the case 82. The pair of the wires 11 are connected to the wires 13 via the main connector 64 exposed from the case 82. The MS converter 28 is connected to the wires 24 via the sub-connectors 68.

In the present embodiment of the disclosure, a vehicle front-side MS converter 129 that is configured in the same manner as the second converter 29 is arranged on the PCU 12 side in the front side portion of the vehicle. The vehicle front-side MS converter 129 as well as the main converter 16 and the inverter 18 is accommodated in the common PCU case 12a. The vehicle front-side MS converter 129 is connected to the wires 13 in the PCU case 12a via wires 129a. A pair of inter-converter wires 100 are routed between the PCU case 12a in the front side portion of the vehicle and the case 82 in the vehicle rear region. The vehicle front-side MS converter 129 is connected to the inter-converter wires 100 via an inter-converter connector 104 that is exposed from the PCU case 12a. By the same token, the MS converter 28 is connected to the inter-converter wires 100 by an inter-converter connector 102. The inter-converter connector 102 is mounted on the substrate 66 in the inner case 60, and is exposed from the inner case 60 and the case 82. That is, in the present embodiment of the disclosure, the inter-converter connector 102 as well as the main connectors 64 and the sub-connectors 68 is exposed from the case 82. The MS converter 28 and the vehicle front-side MS converter 129 are connected to the wires 28a via the inter-converter wires 100.

In the case of the present embodiment of the disclosure, only a low voltage of the sub-battery 22 is applied to the inter-converter wires 100. Therefore, even in the case where the inter-converter wires 100 extends outside the case 82, there is no need to make a changeover to a state where no voltage is applied, by inserting a switch into the inter-converter wires 10.

Figure 7:
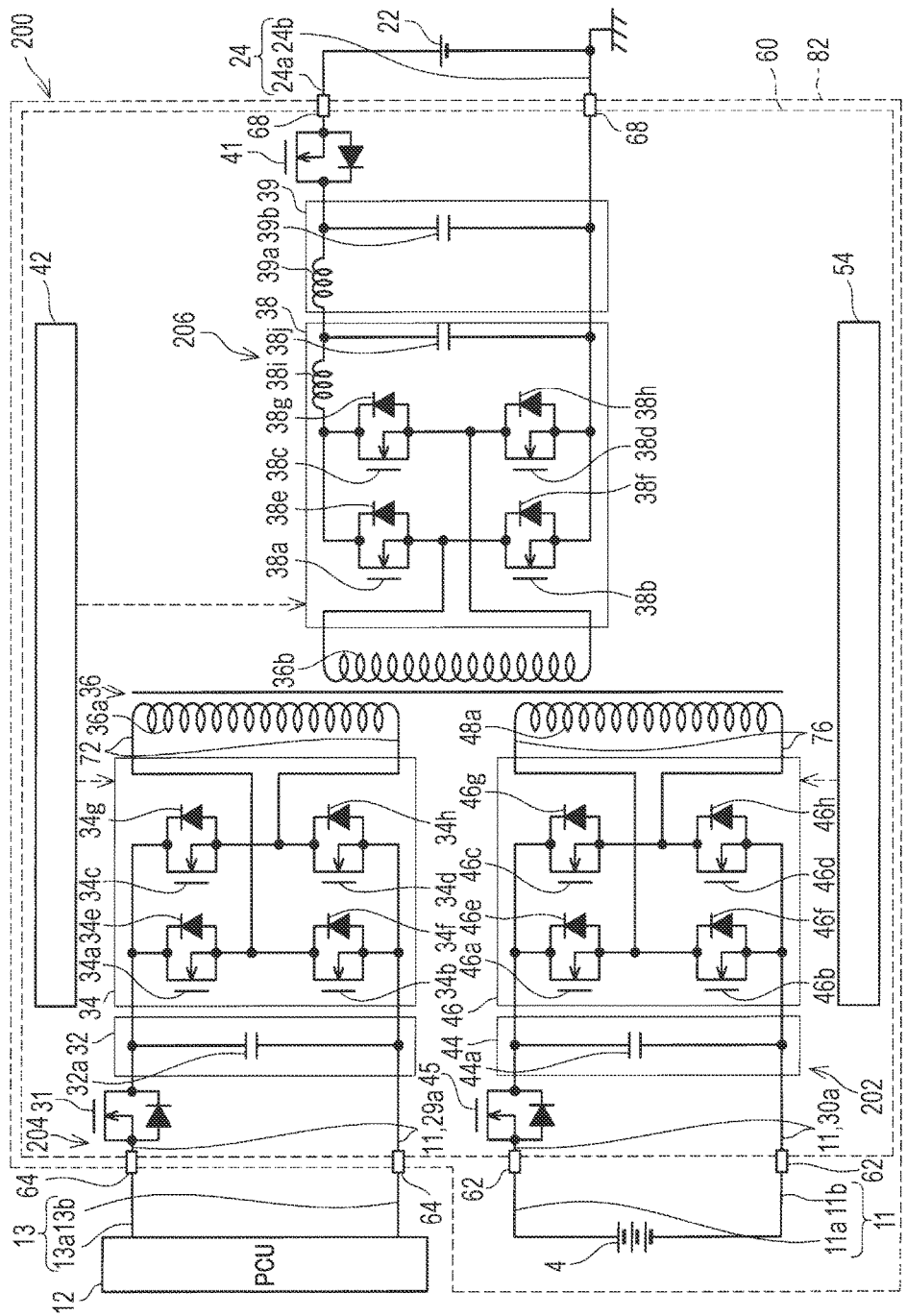
FIG. 7 is a circuit diagram of an MS converter according to the third embodiment of the disclosure.

The unit 2 according to the third embodiment of the disclosure is equipped with an MS converter 200 instead of the MS converter 28 according to the first embodiment of the disclosure. In comparison with the MS converter 28 shown in FIG. 3, the sub-side coil 48b, the sub-side circuit 50 and the sub-side filter 52 of the first converter 30 are dispensed with in the MS converter 200 according to the present embodiment of the disclosure, as shown in FIG. 7. Besides, the main-side coil 48a (first transformer) as well as the main-side coil 36a (second transformer) and the sub-side coil 36b (third transformer) is arranged in the transformer 36. In this configuration, in the transformer 36 as is the case with the first embodiment of the disclosure, electric power can be supplied from the main-side coil 36a to the sub-side coil 36b in a stepped-down manner, and electric power can be supplied from the sub-side coil 36b to the main-side coil 36a in a stepped-up manner. Furthermore, in the transformer 36, electric power can be supplied from the main-side coil 48a to the sub-side coil 36b in a stepped-down manner, and electric power can be supplied from the sub-side coil 36b to the main-side coil 48a in a stepped-up manner. Besides, in the transformer 36, electric power can be supplied from the main-side coil 48a to the main-side coil 36a without changing the voltage thereof, and electric power can be supplied from the main-side coil 36a to the main-side coil 36c without changing the voltage thereof.

The MS converter 200 is further equipped with backflow prevention switches 31, 41 and 45. The main-side filter 44, the main-side circuit 46 and the backflow prevention switch 45 will be referred to hereinafter as a first circuit 202. Besides, the main-side filter 32, the main-side circuit 34 and the backflow prevention switch 31 will be referred to as a second circuit 204. Furthermore, the sub-side filter 39, the sub-side circuit 38 and the backflow prevention switch 41 will be referred to as a third circuit 206.

The first circuit 202 is connected to the wires 11, at positions between the main battery 4 and the SMR 20, via the wires 30a. The second circuit 204 is connected to the wires 11, at positions between the PCU 12 and the SMR, via the wires 29a.

The combination of the first circuit 202, the transformer 36 and the third circuit 206 can perform both a step-down operation for supplying electric power from the wires 11 to the wires 24 in a stepped-down manner, and a step-up operation for supplying electric power from the wires 24 to the wires 11 in a stepped-up manner. The combination of the first circuit 202, the transformer 36 and the third circuit 206 is a so-called bidirectional DCDC converter, and can be regarded as a step-up/step-down DCDC converter. Incidentally, the combination of the first circuit 202, the transformer 36 and the third circuit 206 does not have to perform the step-up operation for supplying electric power from the wires 24 to the wires 11 in a stepped-up manner.

The combination of the second circuit 204, the transformer 36 and the third circuit 206 can perform both a step-down operation for supplying electric power from the wires 11 on the PCU 12 side with respect to the SMR 20 to the wires 24 in a stepped-down manner, and a step-up operation for supplying electric power from the wires 24 to the wires 11 on the PCU 12 side with respect to the SMR 20 in a stepped-up manner. That is, the combination of the second circuit 204, the transformer 36 and the third circuit 206 is a so-called bidirectional DCDC converter, and can be regarded as a step-up/step-down DCDC converter.

The combination of the first circuit 202, the transformer 36 and the second circuit 204 can perform both a supply operation for supplying electric power from the wires 11 on the main battery 4 side with respect to the SMR 20 to the wires 11 on the PCU 12 side with respect to the SMR 20, and a supply operation for supplying electric power from the wires 11 on the PCU 12 side with respect to the SMR 20 side to the wires 11 on the main battery 4 side with respect to the SMR 20. Incidentally, the combination of the first circuit 202, the transformer 36 and the second circuit 204 does not have to perform the supply operation for supplying electric power from the wires 11 on the PCU 12 side with respect to the SMR 20 to the wires 11 on the main battery 4 side with respect to the SMR 20.

In the unit 2, through the operation of the first circuit 202, the second circuit 204 and the third circuit 206, electric power can be exchanged between the wires 11 and the second wires 24 regardless of whether the SMR 20 is conductive or non-conductive. In concrete terms, the sub-battery 22 can be charged with the electric power generated by each of the motors 6 and 8, through the performance of the step-down operation by the combination of the second circuit 204, the transformer 36 and the third circuit 206. Besides, the motors 6 and 8 can be driven with the aid of the electric power of the sub-battery 22, through the performance of the operation of the step-up operation by the combination of the second circuit 204, the transformer 36 and the third circuit 206. Besides, the sub-battery 22 can be charged with the electric power from the main battery 4, through the performance of the step-down operation by the combination of the first circuit 202, the transformer 36 and the third circuit 206. Besides, the main battery 4 can be charged with the electric power from the sub-battery 22, through the performance of the step-up operation by the combination of the first circuit 202, the transformer 36 and the third circuit 206. Furthermore, even when the SMR 20 is non-conductive, the electric power from the main battery 4 can be supplied to the PCU 12 without the intermediary of the wires 24, and the main battery 4 can be charged with the electric power generated by each of the motors 6 and 8, through the performance of the supply operation by the combination of the first circuit 202, the transformer 36 and the second circuit 204.

The backflow prevention switch 45 makes a changeover between a state where electric power can be supplied from the first circuit 202 to the wires 11 on the main battery 4 side (i.e., a state where the switching element is on) and a state where electric power cannot be supplied from the first circuit 202 to the wires 11 on the main battery 4 side (i.e., a state where the switching element is off), by turning on/off the switching element. The backflow prevention switch 31 makes a changeover between a state where electric power can be supplied from the second circuit 204 to the wires 11 on the PCU 12 side (i.e., a state where the switching element is on) and a state where electric power cannot be supplied from the second circuit 204 to the wires 11 on the PCU 12 side (i.e., a state where the switching element is off), by turning on/off the switching element. The backflow prevention switch 41 makes a changeover between a state where electric power can be supplied from the third circuit 206 to the wires 24 (i.e., a state where the switching element is on) and a state where electric power cannot be supplied from the third circuit 206 to the wires 24 (i.e., a state where the switching element is off), by turning on/off the switching element.

Next, the operation of the first to third circuits 202, 204 and 206 will be described. The operation of the second circuit 204 and the third circuit 206 is the same as the operation of the MS converter 28. Incidentally, during the step-up/step-down operations of the combination of the second circuit 204, the transformer 36 and the third circuit 206, electric power can be prevented from being inadvertently supplied to the wires 11 on the main battery 4 side, by holding the backflow prevention switch 45 of the first circuit 202 in the state where electric power cannot be supplied from the first circuit 202 to the wires 11 on the main battery 4 side.

Next, a case where the combination of the first circuit 202, the transformer 36 and the third circuit 206 performs the step-down operation through the operation of the first circuit 202 and the third circuit 206 will be described. When the combination of the first circuit 202, the transformer 36 and the third circuit 206 performs the step-down operation, a DC electric power is converted into an AC electric power in the first circuit 202, the voltage of the AC electric power is stepped down in the transformer 36, and the AC electric power is converted into a DC electric power in the third circuit 206. In this case, in the sub-side circuit 38, rectification by the recirculation diodes 38e, 38f, 38g and 38h is carried out, and smoothing is carried out in the sub-side filter 39. Thus, electric power can be supplied from the wires 11 to the wires 24 in a stepped-down manner. Incidentally, in the sub-side circuit 38, each of the switching elements 38a, 38b, 38c and 38d is on while a current flows through a corresponding one of the recirculation diodes 38e, 38f, 38g and 38h that is connected in parallel thereto. Thus, the current flowing through each of the recirculation diodes 38e, 38f, 38g and 38h can be reduced.

Next, a case where the combination of the first circuit 202, the transformer 36 and the third circuit 206 performs the step-up operation through the operation of the first circuit 202 and the third circuit 206 will be described. When the combination of the first circuit 202, the transformer 36 and the third circuit 206 performs the step-up operation, a DC electric power is converted into an AC electric power in the third circuit 206, the voltage of the AC electric power is stepped up in the transformer 36, and the AC electric power is converted into a DC electric power in the first circuit 202. In this case, in the main-side circuit 46, rectification by the recirculation diodes 46e, 46f, 46g and 46h is carried out, and smoothing is carried out in the main-side filter 44. Thus, electric power can be supplied from the wires 24 to the wires 11 in a stepped-up manner. Incidentally, in the main-side circuit 46, each of the switching elements 46a, 46b, 46c and 46d is on while a current flows through a corresponding one of the recirculation diodes 46e, 46f, 46g and 46h that is connected in parallel thereto. Thus, the current flowing through each of the recirculation diodes 46e, 46f, 46g and 46h can be reduced.

During the step-up/step-down operations of the combination of the first circuit 202, the transformer 36 and the third circuit 206, electric power can be prevented from being inadvertently supplied to the wires 11 on the PCU 12 side, by holding the backflow prevention switch 31 of the second circuit 204 in the state where electric power cannot be supplied from the second circuit 204 to the wires 11 on the PCU 12 side.

Next, a case where the combination of the first circuit 202, the transformer 36 and the second circuit 204 performs the supply operation through the operation of the first circuit 202 and the second circuit 204 will be described. When the combination of the first circuit 202, the transformer 36 and the second circuit 204 performs the supply operation, a DC electric power is converted into an AC electric power in the first circuit 202, the voltage of the AC electric power is not changed in the transformer 36, and the AC electric power is converted into a DC electric power in the second circuit 204. In this case, in the main-side circuit 34, rectification by the recirculation diodes 34e, 34f, 34g and 34h is carried out, and smoothing is carried out in the main-side filter 32. Thus, with the SMR 20 holding the wires 11 non-conductive, electric power can be supplied from the wires 11 on the main battery 4 side with respect to the SMR 20 to the wires 11 on the PCU 12 side with respect to the SMR 20 without changing the voltage thereof. Incidentally, in the main-side circuit 34, each of the switching elements 34a, 34b, 34c and 34d is on while a current flows through a corresponding one of the recirculation diodes 34e, 34f, 34g and 34h that is connected in parallel thereto. Thus, the current flowing through each of the recirculation diodes 34e, 34f, 34g and 34h can be reduced.

Besides, when the combination of the first circuit 202, the transformer 36 and the second circuit 204 performs the supply operation, a DC electric power is converted into an AC electric power in the second circuit 204, the voltage of the AC electric power is not changed in the transformer 36, and the AC electric power is converted into a DC electric power in the first circuit 202. In this case as well as the case where the combination of the first circuit 202, the transformer 36 and the third circuit 206 performs the step-up operation, an AC electric power is converted into a DC electric power in the main-side circuit 46. Thus, with the SMR 20 holding the wires 11 non-conductive, electric power can be supplied from the wires 11 on the PCU 12 side with respect to the SMR 20 to the wires 11 on the main battery 4 side with respect to the SMR 20, without changing the voltage thereof.

During this supply operation, electric power can be prevented from being inadvertently supplied to the wires 24, by holding the backflow prevention switch 41 of the third circuit 206 in the state where electric power cannot be supplied from the third circuit 206 to the wires 24.

According to this configuration, the main battery 4, the MS converter 200 and the SMR 20 are all arranged in the common case 82. Thus, the wires 10, 11 and 30a between the main battery 4 and the MS converter 28 can be routed without being exposed from the case 82. As a result, the wires 30a can dispense with a switch.

The concrete examples of the disclosure have been described above in detail. However, these concrete examples are nothing more than exemplifications, and do not limit the claims. The art described in the claims encompasses various modifications and alterations of the concrete examples exemplified above.

Figure 8:
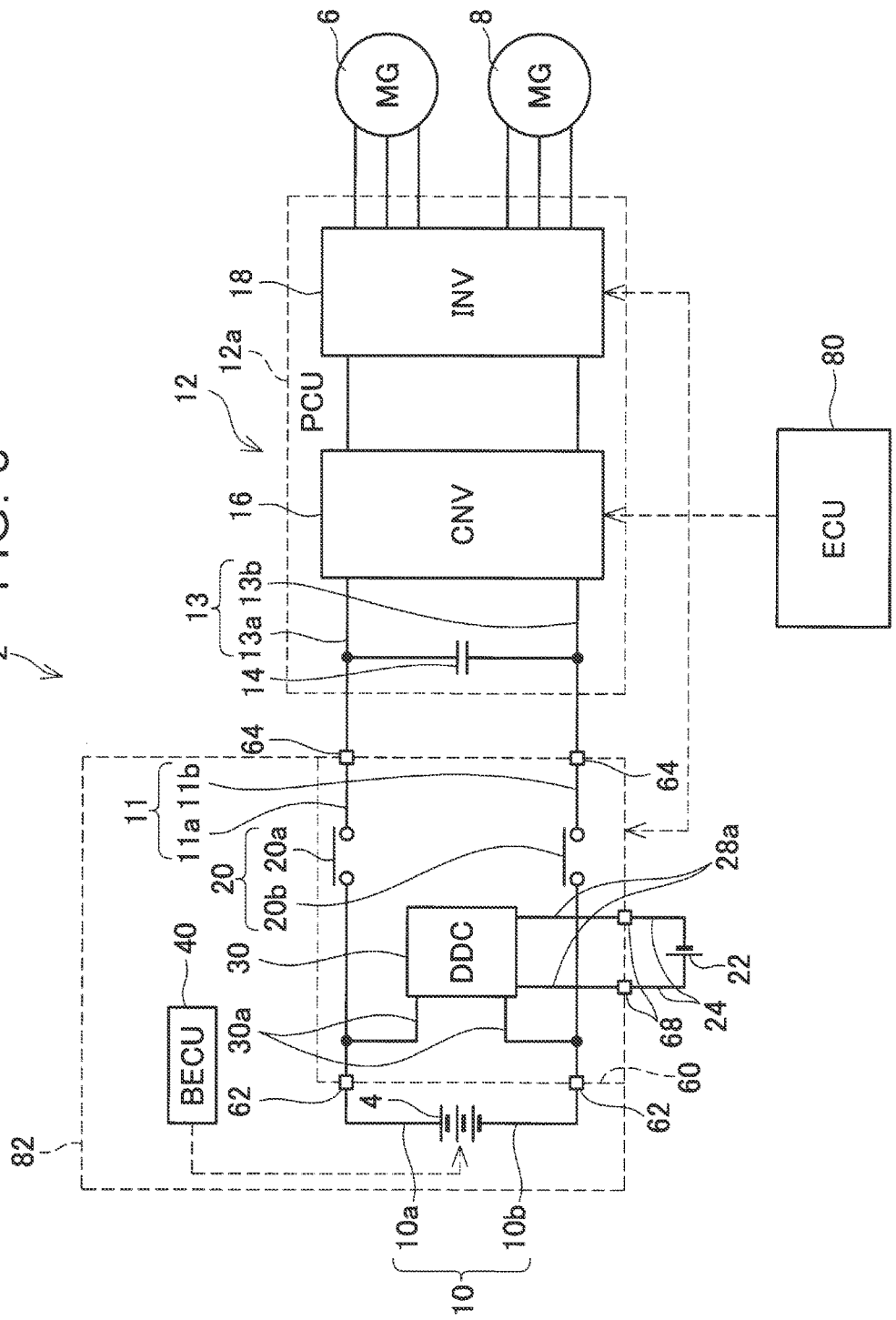
FIG. 8 is a block diagram of an electric system and a drive system of a hybrid vehicle according to a modification example.

For example, as shown in FIG. 8, the MS converter 28 of the unit 2 may be equipped with the first converter 30, and on the other hand, may not be equipped with the second converter 29. The first converter 30 may be accommodated in the case 82.

Besides, for example, the negative electrode-side one of the pair of the wires 24 may be grounded outside the case 82. In this case, the unit 2 may not be equipped with the negative electrode-side one of the pair of the sub-connectors 68. Besides, the unit 2 may not be equipped with the negative electrode-side one of the pair of the wires 28a. In this case, the converters 29 and 30 may be grounded with the aid of, for example, the wires 11.

Besides, the technical elements described in the present specification or the drawings are technically useful either alone or in various combinations, and are not limited to the combinations set forth in the claims at the time of the filing of the application. Besides, the art exemplified in the present specification or the drawings can achieve a plurality of objects at the same time, and is technically useful by achieving one of the objects in itself.

The main features of embodiments of the disclosure described below will be mentioned. Incidentally, the technical elements mentioned below are independent of one another, are technically useful either alone or in various combinations, and are not limited to the combinations set forth in the claims at the time of the filing of the application.

What is claimed is:

1. A main battery unit configured to be connected to a pair of first wires and a pair of second wires, the main battery unit comprising:
   a case;
   the pair of first wires being located outside the case of the main battery unit, the pair of first wires being wires extending to an electric power control unit configured to supply electric power to a motor for running,
   the pair of second wires being located outside the case of the main battery unit, and the pair of second wires being wires extending to a sub-battery configured to supply electric power to an auxiliary machine,
   a pair of main connectors exposed from the case and respectively connected to the pair of first wires; and
   a sub-connector exposed from the case and connected to the pair of second wires;
   wherein the ease accommodates:
   a main battery;
   a pair of third wires that connect a pair of electrodes of the main battery to the pair of main connectors;
   system main relays including a pair of switches that are respectively inserted in the pair of third wires and switch between conduction and non-conduction of each of the pair of third wires;
   a main-sub converter;
   main-side converter wires including a pair of fourth wires that connect each of the pair of third wires, that is closer to the main battery than to the system main relays, to the main-sub converter; and
   a pair of fifth wires connected to the sub-connector and the main-sub converter.

2. The battery unit according to claim 1, wherein the case accommodates a second main-side converter wire including a pair of sixth wires that respectively connects each of the pair of third wires, that is closer to the main connector than to the system main relays, to the main-sub converter.

3. The battery unit according to claim 2, wherein
   the main-sub converter includes a first converter and a second converter,
   the pair of fourth wires are connected to the first converter, and
   the pair of sixth wires are connected to the second converter.

4. The battery unit according to claim 2, wherein
   the main-sub converter includes a first circuit connected to the pair of fourth wires, a second circuit connected to the pair of sixth wires, a third circuit connected to the sub-connector, a first transformer provided in the first circuit, a second transformer provided in the second circuit, a third transformer provided in the third circuit,
   the first circuit is configured to convert a direct current electric power of the pair of fourth wires into an alternating current electric power,
   the first circuit is configured to convert the alternating current electric power supplied via the first transformer into a direct current electric power,
   the second circuit is configured to convert a direct current electric power of the pair of sixth wires into an alternating current electric power,
   the second circuit is configured to convert the alternating current electric power supplied via the second transformer into a direct current electric power,
   the third circuit is configured to convert a direct current electric power of the second wires into an alternating current electric power,
   the third circuit is configured to convert the alternating current electric power supplied via the third transformer into a direct current electric power.

* * * * *